United States Patent [19]

Tamada

[11] Patent Number: 4,853,806

[45] Date of Patent: Aug. 1, 1989

[54] APPARATUS FOR REGULATING THE FORCE RENDERED TO A MAGNETIC DISC BY A MAGNETIC HEAD IN A ROTARY MAGNETIC DISC DEVICE

[75] Inventor: Kazukiyo Tamada, Tokyo, Japan

[73] Assignee: Fuji Photo Film Co., Ltd., Kanagawa, Japan

[21] Appl. No.: 913,757

[22] Filed: Sep. 30, 1986

[30] Foreign Application Priority Data

Oct. 11, 1985 [JP] Japan .................................. 60-226326
Oct. 11, 1985 [JP] Japan .................................. 60-226328

[51] Int. Cl.⁴ .......................... G11B 5/54; G11B 17/32
[52] U.S. Cl. ............................... 360/99.06; 360/99.12; 360/105; 360/130.34; 358/909
[58] Field of Search ............... 360/106, 97, 99, 130.34, 360/105

[56] References Cited

U.S. PATENT DOCUMENTS 4,445,157 4/1984 Takahashi ............................. 360/99
4,660,111 4/1987 Morimoto ............................. 360/99

*Primary Examiner*—Robert S. Tupper
*Attorney, Agent, or Firm*—Oliff & Berridge

[57] ABSTRACT

A rotary magnetic disc device in an electronic camera system, wherein a subject is still-photographed electronically and recorded in a rotating magnetic disc, and the reproducing of an image is carried out by a television system or a printer.

In the above-described rotary magnetic disc device, in order to make the magnetic disc lie along a magnetic head, a regulating plate is opposed to the magnetic head, interposing therebetween the magnetic disc.

In the rotary magnetic disc device according to the present invention, the regulating plate moves, following the magnetic head, whereby, an urging force rendered to the magnetic disc by the magnetic head is not varied between the inner periphery and the outer periphery of the magnetic disc and remains constant.

5 Claims, 6 Drawing Sheets

F I G. 10
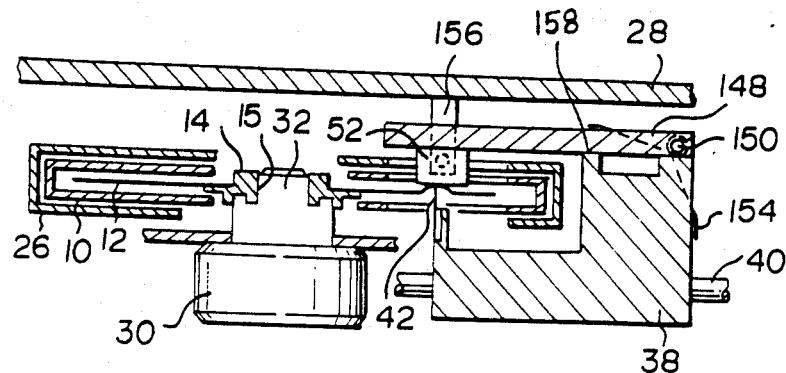
F I G. 11
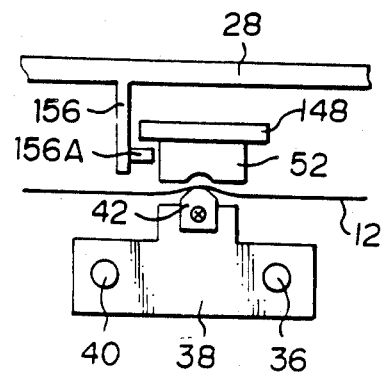
F I G. 12
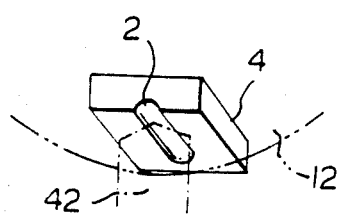
F I G. 13
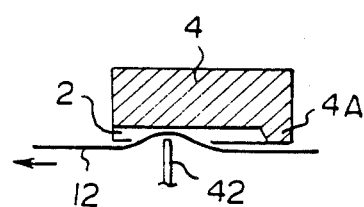

APPARATUS FOR REGULATING THE FORCE RENDERED TO A MAGNETIC DISC BY A MAGNETIC HEAD IN A ROTARY MAGNETIC DISC DEVICE

BACKGROUND OF THE INVENTION

1. Field of the Invention

This invention relates to a rotary magnetic disc device, and more particularly to a rotary magnetic disc device used in a magnetic recording-reproducing apparatus for an electronic still camera and the like.

2. Description of the Prior Art

Recently, there has been developed an electronic still camera system wherein an image pickup device such as a solid state image sensing device or an image pickup tube is combined with a recording device using an inexpensive magnetic disc as a recording medium and yet having a comparatively high memory capacity, a subject is still-photographed electronically and recorded onto a rotating magnetic disc, and the reproduction of an image is carried out by a television, a printer or the like, which are provided separately. The above-described camera system has become the object of attention.

The magnetic disc used in the above-described camera system is normally used in the form of a magnetic disc pack. The magnetic disc pack is rotatably provided therein with the magnetic disc for magnetically recording still image information and the like, and this magnetic disc pack is used as being mounted to a rotary magnetic disc device assembled in an electronic camera. It is troublesome and inconvenient to directly couple a center hole formed in a center core in the central portion of the magnetic disc of the magnetic disc pack onto a rotary driving shaft on the magnetic recording-reproducing apparatus when the magnetic disc pack is mounted to the magnetic recording-reproducing apparatus in the electronic camera, and there is a possibility of being unable to accurately mount the magnetic disc pack onto the magnetic recording-reproducing apparatus.

To avoid the above-described troublesomeness, there has heretofore been proposed a device for loading or unloading a magnetic disc pack. This device for loading or unloading a magnetic disc pack is of such an arrangement that there is provided a holder openably supported on a main body of the magnetic recording-reproducing apparatus, the magnetic disc pack is inserted into the holder, and thereafter, the holder is closed, so that the magnetic disc of the magnetic disc pack in the holder can be mounted onto the rotary driving shaft of the main body of the apparatus. A center core is formed in the center portion of the magnetic disc and the rotary driving shaft is coupled into this center hole of the center core to thereby rotate the magnetic disc in the magnetic disc pack.

The magnetic disc used in the above-described electronic camera and the like, differing from an ordinary floppy disc, is recorded with high density and rotated at high speed, whereby a head touch differs from the one of an ordinary floppy disc, wherein the disc is urged against the side of a magnetic head through a pad. More specifically, as shown in FIGS. 12 and 13, in the case of the electronic camera and the like, a regulating plate 4 having a recess 2 is opposed to a magnetic head 42, interposing therebetween the magnetic disc 12, and the regulating plate 4 is located at a predetermined position relative to the magnetic head 42, whereby the magnetic disc 12 is lain along the magnetic head 42. Due to this effect of the regulating plate 4, a torque of the magnetic disc 12 can be decreased as compared with the case where urging is performed by the pad of the ordinary floppy disc. However, in the above-described rotary magnetic disc device, the magnetic disc 12 is constantly brought into contact with the outermost peripheral portion 4A of the regulating plate 4, and the magnetic head 42 is positioned in the recess 2 of the regulating plate 4, and moves while being in abutting contact with the magnetic disc 12. At this time, an urging force (the head touch) rendered to the magnetic disc 12 by the magnetic head 42 is varied between the outer periphery and the inner periphery of the magnetic disc 12. This variation in the urging force adversely affects the picture quality during magnetic recording or reproducing. Further-more, in the above-described rotary magnetic recording-reproducing apparatus, it becomes necessary to provide the regulating plate 4 having a length corresponding to the total movement stroke of the magnetic head 42, which, increasing the installation space of the regulating plate 4, presents an obstacle in rendering the electronic camera and the like compact in size.

SUMMARY OF THE INVENTION

The present invention has been developed to obviate the above-described disadvantages of the prior art and has as its object the provision of a rotary magnetic disc device, wherein an urging force rendered to a magnetic disc by a magnetic head is not varied, and a space for a regulating plate can be minimized.

To achieve the above-described object, the present invention contemplates in a magnetic recording-reproducing apparatus, wherein magnetic recording is made into or magnetic reproducing is made from a magnetic disc rotatably housed in a magnetic disc pack, comprising:

a head carriage including a magnetic head, for moving in the radial direction of the magnetic disc to make magnetic recording into and magnetic reproducing from the magnetic disc through the magnetic head;

a holder housing the magnetic disc pack, for guiding the magnetic disc pack to a position where a center core formed in the rotary center portion of the magnetic disc housed in the magnetic disc pack is coupled to a rotary driving shaft on the main body; and a movable member including a regulating plate and being movable in the radial direction of the magnetic disc; whereby, during magnetic recording or reproducing, the regulating plate is made to lie along the magnetic disc and the movable member and the head carriage are engaged with each other to make the regulating plate follow the magnetic head in movement, and, when the holder is released, the movable member and the head carriage are disengaged from each other to make the regulating plate be retracted from the magnetic disc.

Furthermore, to achieve the above-described object, the present invention contemplates in a magnetic recording-reproducing apparatus, wherein magnetic recording is made into or magnetic reproducing is made from a magnetic disc rotatably house in a magnetic disc pack, comprising:

a head carriage including a magnetic head, for moving in the radial direction of the magnetic disc to make magnetic recording into and magnetic reproducing from the magnetic disc through the magnetic head;

a holder housing the magnetic disc pack, for guiding the magnetic disc pack to a position where a center core formed in the rotary center portion of the magnetic disc housed in the magnetic disc pack is coupled to a rotary driving shaft on a main body of apparatus; and a regulating plate provided at the forward end of a rocking arm pivotally supported on the head carriage; whereby the regulating plate is moved, following the magnetic head.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 10 is a partial sectional view showing the second embodiment of the present invention, with the cover member being closed;

FIG. 11 is a partial front view showing the second embodiment of the present invention, with the cover member being closed;

FIG. 12 is a perspective view showing the regulating plate; and

FIG. 13 is a sectional view showing the regulating plate.

DETAILED DESCRIPTION OF THE INVENTION

Detailed description will hereunder be given of the preferred embodiment of the rotary magnetic disc device according to the present invention with reference to the accompanying drawings.

Figure 5:
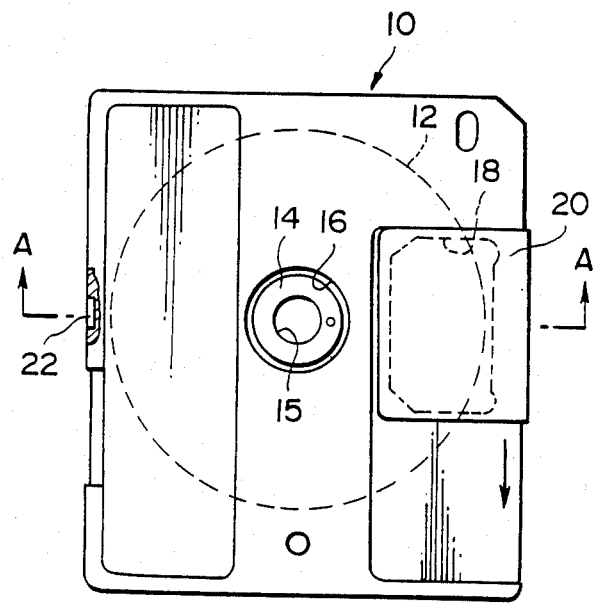
FIG. 5 is a plan view showing the magnetic disc pack.
Figure 6:
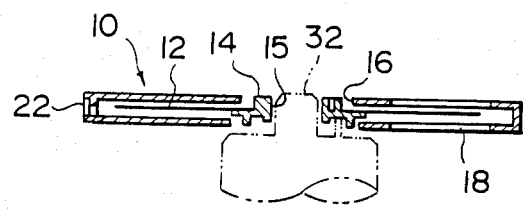
FIG. 6 is a plan view of the magnetic disc pack, taken along the line A—A in FIG. 5.

FIG. 5 is a plan view showing the magnetic disc pack used in the magnetic recording-reproducing apparatus for an electronic camera and the like. FIG. 6 is a sectional view taken along the line A—A in FIG. 5. As shown in FIG. 5, the magnetic disc pack 10 is formed into a generally square shape and has rotatably mounted therein a magnetic disc 12 capable of recording therein still image information and the like. The magnetic disc 12 is provided in the central portion thereof with a center core 14 as being a reinforcing member which is exposed to the outside through a circular opening 16 of the magnetic disc pack 10. The center core 14 is formed with a center hole 15. The center hole 15 is formed with an elastic piece, not shown. A driving shaft 32 to be described hereunder is coupled into the center hole 15 of the center core 14 against a biasing force of this elastic piece. The magnetic disc pack 10 is formed with a window 18, at which is located a magnetic head to be described hereunder. This window 18 for the magnetic head is opened or closed by a slidable shutter 20. More specifically, before the magnetic disc pack 10 is inserted into a holder to be described hereunder, the shutter 20 closes the window 18 to prevent dust from adhering to the magnetic disc 12. After the magnetic disc pack 10 is inserted into the holder to be described hereunder, the shutter 20 moves downward in FIG. 5 to open the window 18 for the magnetic head, so that recording into the magnetic disc 12 or reproducing therefrom can be effected. In the magnetic disc pack 10, a recess 22 for engaging is formed at a side edge opposite to the shutter 20. This recess 22 is used as a provisional lock for the magnetic disc pack 10 when the magnetic disc pack 10 is inserted into the holder.

Figure 1:
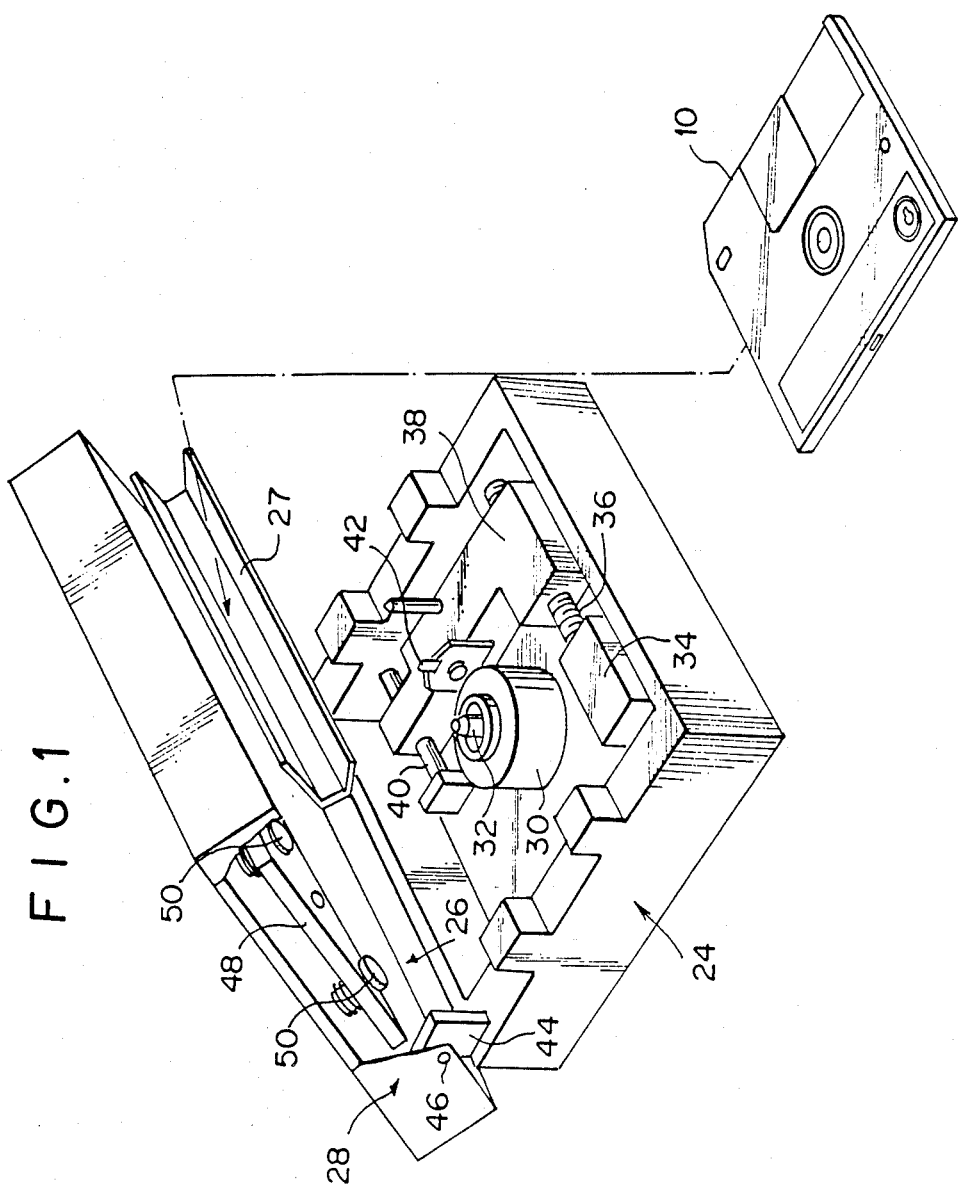
FIG. 1 is a general perspective view showing a first embodiment of the present invention, with the cover member being open.

FIG. 1 shows the outer appearance of the construction of the magnetic recording-reproducing apparatus constituted by a main body 24, a holder 26 and a cover member 28. First, the inner construction of the main body 24 of the apparatus will be described. A motor 30 for driving the magnetic disc is provided in the main body 24 of the apparatus, and a driving shaft 32 of this motor 30 is coupled into the center hole 15 of the center core 14 of the magnetic disc pack 10, to thereby rotate the magnetic disc 12 at a predetermined speed in the magnetic disc pack 10. In FIG. 1, designated at 34 is a motor for feeding the magnetic head, a lead screw 36 connected to an output shaft of this motor 34, a head carriage 38 threadably coupled to this lead screw 36 and guided by a guide shaft 40 to move, and a magnetic head 42 provided on a head carriage 38. As a consequence, when the motor 34 is rotated at the predetermined speed, the head carriage 38 is moved in the axial direction of the guide shaft 40 by a predetermined pitch by the rotation of the lead screw 36, whereby the magnetic head 42 moves in the radial direction of the magnetic disc 12, so that still image information can be recorded or reproduced track after track on the magnetic disc 12. Provided at one end portion of the main body 24 of the apparatus is a bracket 44, onto which are pivotally supported a holder 26 and a cover member 28 through a pin 46. The holder 26 can receive therein the magnetic disc pack. Further, secured to the rear surface of the cover member 28 through pins 50, 50, 50 and 50 (only two pins are shown in FIG. 1) is a holding plate 48, to which is secured a regulating plate 52 shown in FIG. 2. The regulating plate 52 is opposed to the magnetic head 42, interposing therebetween the magnetic disc 12 during recording or reproducing, and has a function to make the magnetic disc 12 lie along the magnetic head 42. The cover member 28 can receive therein the holder 26. The cover member 28 is biased by a spring, not shown, in the opening direction relative to the main body 24 of apparatus. Further, confined between the cover member 28 and the holder 26 is another spring, not shown, which biases the holder 26 to be separated from the cover member 28. As a consequence, as shown in FIG. 1, when the cover member 28 is open, the holder 26 is separated from the main body 24 of apparatus and the cover member 28, and opens a magnetic disc pack insertion opening 27 thereof. Formed on the surface of the holder 26, which is opposed to the main body 24, are openings for receiving positioning pins, not shown, provided on the main body 24 for positioning the rotary shaft 32 provided on the main body 24, the magnetic head 42 and the main body 24 relative to the magnetic disc pack 10.

An engaging member, not shown, is provided on an end face of the holder 26. This engaging member is coupled into the recess 22 of the magnetic disc pack 10 inserted into the holder 26, to thereby provisionally lock the magnetic disc pack 10 in the holder 26.

Figure 2:
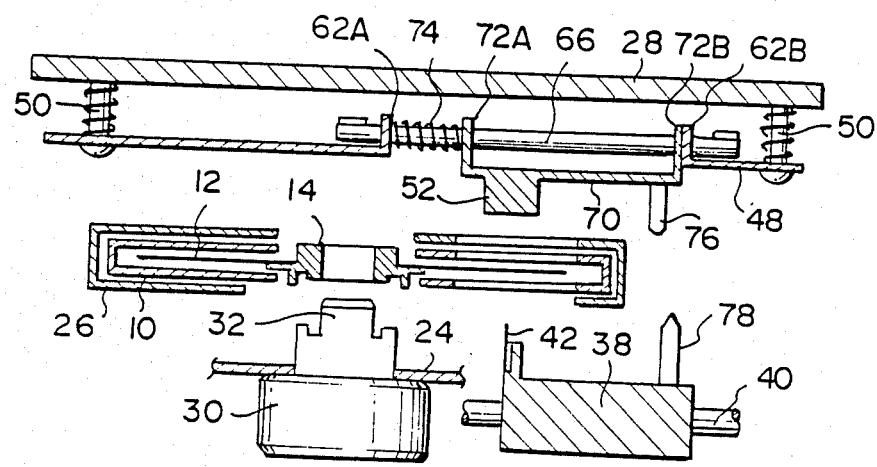
FIG. 2 is a partial sectional view showing the first embodiment of the present invention, with the cover member being open.
Figure 3:
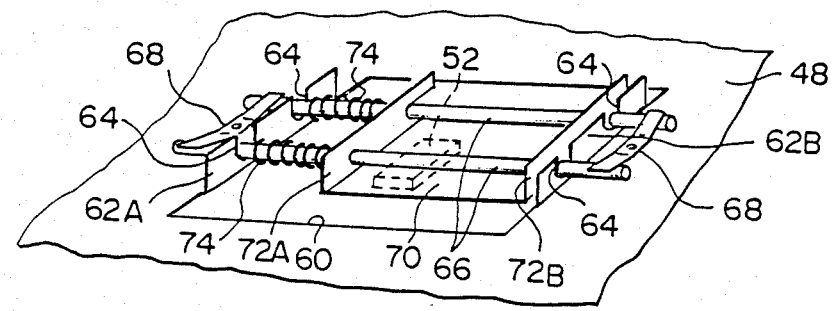
FIG. 3 is a perspective view showing the construction for the movement of the regulating plate in the first embodiment of the present invention.

The construction for mounting the regulating plate 52 will hereunder be described with reference to FIGS. 2 and 3. As shown in FIG. 3, a rectangular opening 60 is formed in a holding plate 48, and erected pieces 62A and 62B are erected at opposite side edges of this opening 60. The erected pieces 62A and 62B are formed with U-shaped grooves 64 and 64, respectively, and guide bars 66 and 66 are supported by the grooves 64 and 64. The guide bars 66 and 66 are secured to the top surface of the holding plate 48 through leaf springs 68 and 68, the central portions of which are fastened by screws, respectively. A plate 70 secured on the undersurface thereof with the regulating plate 52 is bent at opposite sides thereof upwardly to thereby be formed into a generally U-shape. Side plates 72A and 72B thus bent are inserted therethrough with the guide bars 66 and 66. As a consequence, the plate 70 is guided by the guide bars 66 and 66 to be movable to the right and left in the opening 60. Furthermore, the guide bars 66 and 66 are wound therearound with springs 74 and 74, which are confined between the erected piece 62A and the side plate 72A of the plate 70, whereby the plate 70 is biased to the right in FIGS. 2 and 3.

Figure 4:
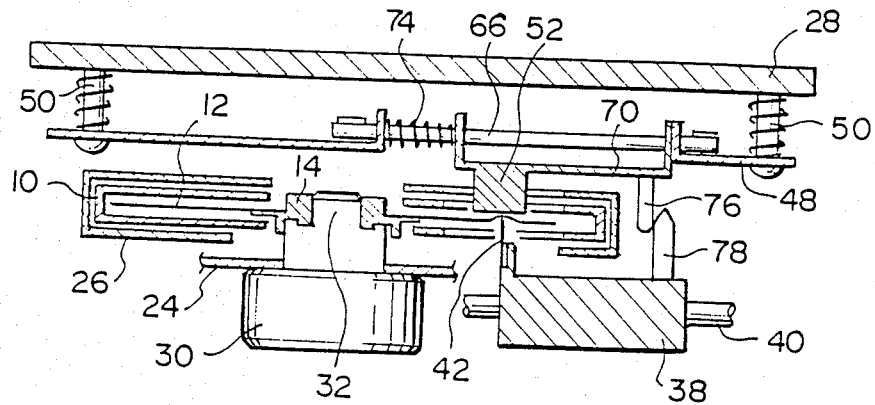
FIG. 4 is a partial sectional view of the first embodiment of the present invention, with the cover member being closed.

On the other hand, a pin 76 is projected from the undersurface of the plate 70, and a pin 78 is planted at a position corresponding to the pin 76 on the head carriage 38, whereby, when the cover member 28 is closed, the pins 76 and 78 are brought into abutting contact with each other as shown in FIG. 4.

The following is the action of one embodiment of the rotary magnetic disc device with the above-described arrangement according to the present invention. First, when the magnetic disc pack 10 is inserted into the holder 26 with the cover member 28 being open as shown in FIG. 1 so as to load the magnetic disc pack 10, the magnetic disc pack 10 is provisionally locked by the engaging member, not shown, in the holder 26. Next, when the cover member 28 is pushed down toward the main body 24 in this state, the holder 26 is gradually closed, and the driving shaft 32 is coupled into the center core 14 as shown in FIG. 4. As shown in FIG. 4, in this state, the regulating plate 52 is located in a position where the regulating plate 52 can come into contact with the magnetic disc 12, and opposed to the magnetic head 42, interposing therebetween the magnetic disc 12. As a consequence, in the state shown in FIG. 4, the magnetic disc 12 is made to lie along the magnetic head 42 through the agency of the regulating plate 52, and can perform the magnetic recording or reproducing.

When the head carriage 38 is fed by the rotation of the lead screw 36 from this state, the regulating plate 52 moves together with the head carriage 38 because the pin 76 integrally formed on the plate 70 is engaged with the pin 78 integrally formed on the head carriage 38. As a result, the magnetic head 42 and the regulating plate 52 are moved to the right and the left, corresponding to each other, to thereby perform the magnetic recording or reproducing on the magnetic disc 12. More specifically, when the head carriage 38 moves to the left, the plate 70 is pushed by the pin 78 to move to the left against the biasing force of the spring 74. When the head carriage 38 moves to the right, the plate 70 moves to the right due to the biasing force of the spring 74.

Since the pin 76 integrally formed on the plate 70 is engaged with the pin 78 integrally formed on the head carriage 38 in the above embodiment, the plate 70 moves together with the magnetic head 42, whereby the urging force (the head touch) of the magnetic head 42 becomes constant all the times, so that the picture quality is not varied between the outer periphery and the inner periphery of the magnetic disc 12. Since the regulating plate 52 moves together with the magnetic head 42, the regulating plate need not have a length corresponding to a stroke of movement of the magnetic head 42, so that the regulating plate 52 can be reduced in size.

As has been described hereinabove, with the rotary magnetic disc device according to the present invention, the regulating plate is made movable in the radial direction of the magnetic disc and mounted in a manner to be interlocked with the head carriage, so that the regulating plate can move together with the magnetic head and can obtain the constant urging force (the head touch). Furthermore, the regulating plate need not have a length corresponding to a stroke of movement of the magnetic head, so that the regulating plate can be reduced in size.

FIGS. 7 to 11 show the second embodiment of the rotary magnetic disc device according to the present invention. In this second embodiment, same reference numerals in the first embodiment are used to designate same or similar parts, so that the detailed description need not be repeated.

Figure 7:
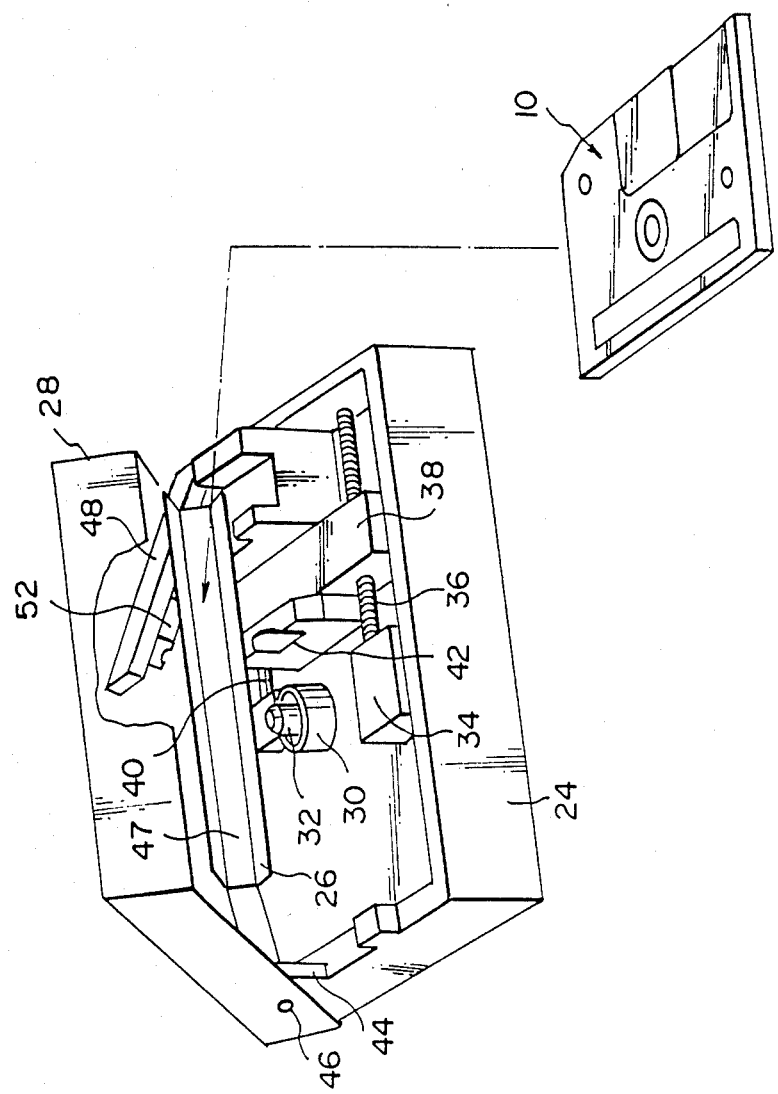
FIG. 7 is a general perspective view showing a second embodiment of the present invention, with the cover member being open.
Figure 8:
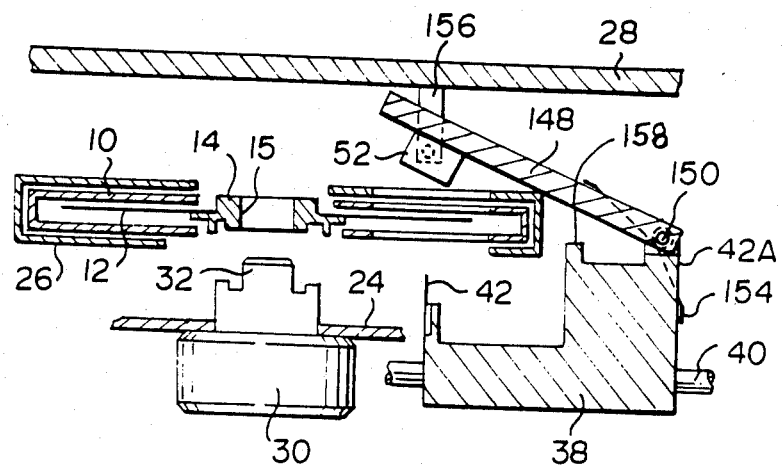
FIG. 8 is a partial sectional view showing the second embodiment of the present invention, with the cover member being open.
Figure 9:
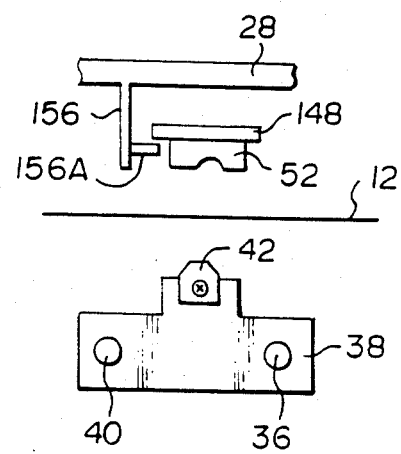
FIG. 9 is a partial front view showing the second embodiment of the present invention, with the cover member being open.

The construction for mounting the regulating plate 52 in the second embodiment will hereunder be described with reference to FIGS. 7 and 8. The regulating plate 52 is provided at the forward end of a plate 148, which is pivotally supported at the top end 42A of the head carriage 42 through a pin 150. The plate 148 is biased by a spring 154 in the counterclockwise direction in FIG. 8. A position regulating surface 158 is provided on the head carriage 38 for positionally regulating in the vertical direction the position of the regulating plate 52.

On the other hand, a generally-shaped support member 156 is suspended from the undersurface of the cover member 28. Supported in abutting contact with a pin 156A projected sideways from the support member 156 is a side edge of the plate 148 in the state of being biased by a spring 154. More specifically, the plate 148 is supported by the support member 156 against the turning biasing force of the spring 154 in the counterclockwise direction, whereby the regulating plate 52 is interlocked with the on-off operation of the cover member 28 to be moved in the vertical direction. More specifically, when the cover member 28 is closed, the regulating plate 52 is lowered to a position where the regulating plate 52 can come into contact with the magnetic disc 12, and, when the cover member 28 is opened, the regulating plate 52 is separated from the magnetic disc 12.

The following is the action of the second embodiment of the rotary magnetic disc device with the above-described arrangement according to the present invention. First, when the magnetic disc pack 10 is inserted into the holder 26 with the cover member 28 being open as shown in FIG. 7 so as to load the magnetic disc pack 10, the magnetic disc pack 10 is provisionally locked by the engaging member, not shown, in the holder 26. Next, when the cover member 28 is pushed down toward the main body 24 in this state, the holder 26 is gradually closed, the driving shaft 32 is coupled into the center core 14 as shown in FIG. 10. is shown in FIGS. 10 and 11, in this state, the position regulating surface 158 supports the regulating plate to restrict the force of the regulating plate against the disc 12, the regulating plate 52 is located in a position where the regulating plate 52 can come into contact with the magnetic disc 12, and opposed to the magnetic head 42, interposing therebetween the magnetic disc 12. As a consequence, in the state shown in FIGS. 10 and 11, the magnetic disc 12 is made to lie along the magnetic head 42 through the agency of the regulating plate 52, and can perform the magnetic recording or reproducing.

When the head carriage 38 is fed by the rotation of the lead screw 36 from this state, the head carriage 42 and the regulating plate 52 move to the right or the left, to thereby perform the magnetic recording or reproducing on the magnetic disc 12.

Since the regulating plate 52 is secured to the head carriage 38 in the above embodiments, the regulating plate 52 moves, following the magnetic head 42, the urging force (the head touch) of the magnetic head 42 becomes constant all the time, so that the picture quality is not varied between the outer periphery and the inner periphery of the magnetic disc 12. Since the regulating plate 52 moves together with the magnetic head 42, the regulating plate 52 need not have a length corresponding to the stroke of movement of the magnetic head 42, so that the regulating plate 52 can be reduced in size.

In the first and the second embodiments, the hinge type loading method, wherein the cover member 28 and the holder 26 are rotatably supported by the main body 24 of apparatus, has been described, however, the present invention is applicable to so-called slot-in type front loading method, wherein the cover member and the holder are parallelly guided by cam grooves and the like to be moved in the vertical direction.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A rotary magnetic disc device, wherein magnetic recording or reproducing is performed on a magnetic disc rotatably housed in a magnetic disc pack, comprising:
   a head carriage including a magnetic head, for moving in a radial direction of said magnetic disc to make magnetic recording into and magnetic reproducing from said magnetic disc through said magnetic head;
   a rotary driving shaft provided on a main body of apparatus;
   a holder for receiving said magnetic disc pack, for guiding said magnetic disc pack to a position where a center core formed in a rotary center portion of said magnetic disc housed in said magnetic disc pack is coupled to said rotary driving shaft;
   a regulating plate located in a position opposed to said magnetic head, interposing therebetween said magnetic disc, for making said magnetic disc lie along said magnetic head;
   said regulating plate being mounted on a movable member connected to said head carriage to make said regulating plate follow said magnetic head in movement; and
   a position regulating surface provided on the head carriage for positionally regulating in the vertical direction said regulating plate wherein the regulating plate is supported by said position regulating surface to restrict a force of the regulating plate against said magnetic disc.

2. A rotary magnetic disc device as set forth in claim 1, wherein a cover member openably mounted to the main body and said movable member is pivotally supported at one end thereof by said head carriage and supported at the other end thereof by said cover member, whereby, when said cover member is closed, said regulating plate is made to lie along said magnetic disc, and, when said cover member is opened, said regulating plate is separated from said magnetic disc.

3. A rotary magnetic disc device as set forth in claim 2, wherein said movable member is rotatably biased toward said magnetic disc by resilient members.

4. A rotary magnetic disc device, wherein magnetic recording or reproducing is performed on a magnetic disc rotatably housed in a magnetic disc pack, comprising:
   a head carriage including a magnetic head, for moving in a radial direction of said magnetic disc to make magnetic recording onto and magnetic reproducing from said magnetic disc through said magnetic head;
   a rotary driving shaft provided on a main body of apparatus for rotatably driving said magnetic disc housed in said magnetic disc pack;
   a cover member openably mounted to the main body of apparatus;
   a holder for receiving said magnetic disc pack, for guiding said magnetic disc pack to a position where a center core formed in a rotary center portion of said magnetic disc housed in said magnetic disc pack is coupled to said rotary driving shaft;
   a movable member movably secured to said cover member through guide bars, and movable in the radial direction of said magnetic disc and interlockable with said head carriage to follow said head carriage in movement;
   a regulating plate mounted on said movable member and located in a position opposed to said magnetic head interposing therebetween said magnetic disc, for making said magnetic disc lie along said magnetic head, whereby said regulating plate is made to lie along said magnetic disc when said member is closed and said regulating plate is separated from said magnetic disc when said cover member is opened;
   a pin projecting from said movable member and a pin projecting from said head carriage whereby said pin projecting from said movable member is engaged with said pin projecting from said head carriage when said cover member is closed for causing said movable member and said regulating plate mounted thereon to move, as guided by said guide bars, in accordance with said radial movement of the said head carriage.

5. A rotary magnetic disc device as set forth in claim 4 wherein said movable member is biased in one direction by resilient members.

* * * * *